United States Patent [19]
Yamanaka et al.

[11] Patent Number: 5,777,037
[45] Date of Patent: Jul. 7, 1998

[54] PROCESS FOR PRODUCING ISOBUTYLENE POLYMER

[75] Inventors: Yoshimichi Yamanaka, Osaka; Hiroshi Fujisawa, Hyogo; Takeshi Chiba, Hyogo; Yoshikuni Deguchi, Hyogo; Kazuya Yonezawa, Hyogo, all of Japan

[73] Assignee: Kanegafuchi Kagaku Kogyo Kabushiki Kaisha, Osaka, Japan

[21] Appl. No.: 585,515

[22] Filed: Jan. 16, 1996

[30] Foreign Application Priority Data

Jan. 17, 1995 [JP] Japan ............... 7-020907
Jul. 11, 1995 [JP] Japan ............... 7-197111

[51] Int. Cl.$^6$ .................. C08F 8/00; C08F 2/06; C08F 4/14; C08F 4/16
[52] U.S. Cl. ............... 525/288; 525/267; 525/270; 525/313; 525/918; 526/135; 526/146; 526/147; 526/204; 526/209; 526/216; 526/217; 526/222; 526/221; 526/237; 526/348.7
[58] Field of Search .................. 526/135, 221, 526/237, 146, 147, 348.7, 206, 204, 209, 216, 217, 222; 525/288, 313, 267, 270, 918

[56] References Cited

U.S. PATENT DOCUMENTS

| | | | |
|---|---|---|---|
| 3,493,549 | 2/1970 | Uemura et al. | 526/237 X |
| 5,169,914 | 12/1992 | Kaszas et al. | |
| 5,247,021 | 9/1993 | Fujisawa et al. | 526/221 X |
| 5,290,873 | 3/1994 | Noda et al. | 525/313 |

FOREIGN PATENT DOCUMENTS

| | | |
|---|---|---|
| 0 341 012 | 11/1989 | European Pat. Off. |
| 0 397 081 | 11/1990 | European Pat. Off. |
| 0 452 875 A1 | 10/1991 | European Pat. Off. |
| 1-318014 | 12/1989 | Japan |
| 3-95266 | 4/1991 | Japan |
| WO-A-94 19380 | 9/1994 | WIPO |

OTHER PUBLICATIONS

"The Chemistry of Cationic Polymerization" Pergamon Press Ltd (1963), p. 133.
S. C. Guhaniyogi et al., "Carbocationic Polymerization in the Presence of Sterically Hindered Bases. III. The Polymerization of Isobutylene by the Cumyl Chloride/BCl$_3$ System", J. Macromol. Sci.–Chem., A18(1), pp. 25–37 (1982).
G. Kaszas et al., "Electron pair donors in carbocationic polymerization", Polymer Bulletin 20, pp. 413–419 (1988).

*Primary Examiner*—Fred Teskin
*Attorney, Agent, or Firm*—Armstrong, Westerman, Hattori, McLeland & Naughton

[57] ABSTRACT

The present invention provides a novel solvent which is capable of providing an excellent isobutylene polymer, little affects the environment, has a lower solubility in water than those of halogenated hydrocarbons having 1 or 2 carbon atoms and can be decomposed relatively easily. Namely, the present invention relates to: a process for producing an isobutylene polymer, which comprises performing a cationic polymerization reaction in a solvent containing primary and/or secondary monohalogenated hydrocarbon(s) having 3 to 8 carbon atoms, and an isobutylene polymer thus obtained; and a process for producing an isobutylene polymer having a vinyl group introduced into the terminal thereof, which comprises reacting the isobutylene polymer produced above with 1,9-decadiene or allyltrimethylsilane, and an isobutylene polymer thus obtained.

14 Claims, 2 Drawing Sheets

PROCESS FOR PRODUCING ISOBUTYLENE POLYMER

FIELD OF THE INVENTION

This invention relates to a process for producing an isobutylene polymer having a functional group. More particularly, it relates to a solvent species to be used in a polymerization reaction.

BACKGROUND OF THE INVENTION

Terminal functional polymers (for example, polymers having vinyl groups, etc. at both terminals) are useful as materials for producing photo-setting resins, UV-setting resins, electron radiation curing resins, sealing compounds for electronics, adhesives, modifiers, coating materials, constructional sealings, sealing compounds for laminating glasses, gaskets, medical adhesives or sealings, insulation, etc.

There has been known that an isobutylene polymer having, for example, a chlorine atom bonded to a tertiary carbon at the terminal, which falls within the category of the terminal functional polymers, is produced by the inifer method for the cationic polymerization of isobutylene with the use of 1,4-bis($\alpha$-chloroisopropyl)benzene (hereinafter, referred to simply as "p-DCC") or 1,3,5-tris($\alpha$-chloroisopropyl)benzene (hereinafter, referred to simply as "TCC") as an initiator/chain transfer agent and boron trichloride as a catalyst (cf. U.S. Pat. No. 4,276,394).

Furthermore, there has been reported by Kennedy et al. a large number of research works that when the above-mentioned cationic polymerization reaction is carried out in the presence of an electron donor in a solvent containing a halogenated hydrocarbon having 1 or 2 carbon atoms (e.g., methyl chloride or methylene chloride), an isobutylene polymer having a small Mw/Mn value in GPC (i.e., a polymer having a regular molecular weight) can be obtained (J. Macromol. Sci. Chem., A18(1), 25 (1982), Polym. Bull., 20, 413 (1988), Polym. Bull., 26, 305 (1991) and JP-A-1-318014 (corresponding to U.S. Pat. No. 5,169,914) (the term "JP-A" as used herein means an "unexamined published Japanese patent application")).

Halogenated hydrocarbons having 1 or, 2 carbon atoms, which can impart an appropriate dielectric constant to thereby stabilize the growth terminal or are excellent in the solubility of the polymer thus obtained, have been widely employed as solvents for cationic polymerization. However, these halogenated hydrocarbons having 1 or 2 carbon atoms suffer from some problems such that they are poor in handling characteristics and that very careful attention should be paid to prevent the leakage into the environment.

Methyl chloride, which has a low boiling point (-23.7° C.) and a high toxicity, has been legally designated not only as a high pressure gas but also as a toxic gas. That is to say, it is a substance the handling of which is highly difficult.

On the other hand, methylene chloride has a high solubility in water (2.0% at 20° C.) and it is difficult to make methylene chloride dissolved in water harmless. It is therefore desirable to use a substance with a higher safety as a substitute for methylene chloride.

SUMMARY OF THE INVENTION

An object of the present invention is to provide a novel solvent component which is capable of giving an excellent isobutylene polymer and less influential on the environment than halogenated hydrocarbons having 1 or 2 carbon atoms.

More particularly, an object of the present invention is to provide a solvent component which is less soluble in water than halogenated hydrocarbons having 1 or 2 carbon atoms and can be decomposed relatively easily.

Another object of the present invention is to provide a solvent system being advantageous from the viewpoint of production process, from among solvents which are less soluble in water and can be decomposed relatively easily, i.e., a solvent system capable of giving an isobutylene polymer even at a relatively high monomer concentration.

In practice, an increase in the monomer concentration broadens the range of temperature rise at the polymerization. Accordingly, monomer concentrations are regulated to a low level (1 mol/l or below in usual) in the cases reported hitherto (Polym. Bull., 21, 5 (1989), Polym. Bull., 21, 125 (1989), Polym. Bull., 21, 273 (1989), Polym. Bull., 21, 293 (1989), Polym. Bull., 26, 30 (1991), Polym. Bull., 29, 239 (1992), etc.).

From an industrial viewpoint, however, it has been urgently required to elevate the yield of a polymer produced per unit volume.

For the above-mentioned reasons, the present inventors have conducted extensive investigation to find out a solvent which is usable as a substitute for the halogenated hydrocarbons having 1 or 2 carbon atoms. They have further investigated the solvent compositions of various solvent mixture systems effective in polymerization reactions.

The present inventors have selected primary and/or secondary monohalogenated hydrocarbons having 3 to 8 carbon atoms as substitutes for halogenated hydrocarbons having 1 or 2 carbon atoms and investigated these monohalogenated hydrocarbons. The reasons therefor are as follows.

(1) A tertiary halogenated hydrocarbon is not preferable as a solvent, since it also acts as a polymerization initiator and thus induces a reaction for the formation of a tertiary cation, in addition to the desired reaction initiated by an initiator such as p-DCC.

(2) It is estimated that a halogenated hydrocarbon with a smaller halogen content has the lower solubility in water and can be more easily made harmless via decomposition (solubility in water: methylene chloride, 2.0% by weight; 1,2-dichloroethane, 0.869% by weight; 1-chloropropane, 0.271% by weight; 1-chlorobutane, 0.08% by weight; and 1-chloropentane, 0.02% by weight).

(3) Compared with a polyhalogenated hydrocarbon, a monohalogenated hydrocarbon has a small specific gravity due to a small halogen content per molecule. By using such a monohalogenated hydrocarbon, therefore, the difference in the specific gravity between the organic layer and the aqueous layer during the washing step is enlarged, which facilitates the separation of these layers.

(4) A halogenated hydrocarbon having 2 or less carbon atoms is not preferable, since it tends to show a relatively elevated solubility in water.

(5) A halogenated hydrocarbon having 9 or more carbon atoms has a high boiling point, which results in a problem that much energy is required for the evaporation of the solvent.

As a result of extensive investigations on various solvents satisfying the above-mentioned requirements, the present inventors have successfully found out effective solvent components which are seemingly much less influential on the environment than halogenated hydrocarbons having 1 or 2 carbon atoms.

Accordingly, the constitution of the present invention is as follows.

(1) A process for producing an isobutylene polymer, which comprises performing a cationic polymerization reaction in a polymerization solvent which contains primary and/or secondary monohalogenated hydrocarbon(s) having 3 to 8 carbon atoms.

(2) A process for producing an isobutylene polymer, which comprises mixing the following components (i) to (v) at a temperature of from −100° to 0° C.:

(i) a cation polymerizable monomer containing isobutylene;

(ii) a compound represented by the formula (I):

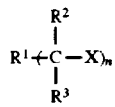

wherein $R^1$ represents an aromatic ring group or a substituted or unsubstituted aliphatic hydrocarbon group; $R^2$ and $R^3$ may be the same or different and each represents a hydrogen atom, or a substituted or unsubstituted monovalent hydrocarbon group, provided that $R^2$ and $R^3$ do not represent a hydrogen atom at the same time when $R^1$ is an aliphatic hydrocarbon group; X represents a halogen atom, an $R^4COO$— group, in which $R^4$ represents a hydrogen atom or an alkyl group having 1 to 5 carbon atoms, or an $R^5O$— group, in which $R^5$ represents a hydrogen atom or an alkyl group having 1 to 5 carbon atoms; and n is an integer of from 1 to 8;

(iii) a Lewis acid, (iv) an electron donating component, in which a donor number defined as a parameter indicating the intensity of a various compound as an electron donor is 15 to 50; and (v) a polymerization solvent containing primary and/or secondary monohalogenated hydrocarbon(s) having 3 to 8 carbon atoms.

(3) A process for producing an isobutylene polymer as described in the above (2), wherein the above primary and/or secondary monohalogenated hydrocarbons having 3 to 8 carbon atoms are selected from a group consisting of 1-chloropropane, 1-chloro-2-methylpropane, 1-chlorobutane, 1-chloro-2-methylbutane, 1-chloro-3-methylbutane, 1-chloro-2,2-dimethylbutane, 1-chloro-3,3-dimethylbutane, 1-chloro-2,3-dimethylbutane, 1-chloropentane, 1-chloro-2-methylpentane, 1-chloro-3-methylpentane, 1-chloro-4-methylpentane, 1-chlorohexane, 1-chloro-2-methylhexane, 1-chloro-3-methylhexane, 1-chloro-4-methylhexane, 1-chloro-5-methylhexane, 1-chloroheptane, 1-chlorooctane, 2-chloropropane, 2-chlorobutane, 2-chloropentane, 2-chlorohexane, 2-chloroheptane and 2-chlorooctane.

(4) A process for producing an isobutylene polymer as described in the above (2) or (3), wherein the above polymerization solvent is a mixture of primary and/or secondary monohalogenated hydrocarbon(s) having 3 to 8 carbon atoms with aliphatic and/or aromatic hydrocarbon(s).

(5) A process for producing an isobutylene polymer as described in the above (4), wherein the above aliphatic or aromatic hydrocarbons are selected from a group consisting of butane, pentane, neopentane, hexane, cyclohexane, methylcyclohexane, heptane, octane, benzene, toluene and xylene.

(6) A process for producing an isobutylene polymer as described in any of the above (2) to (5), wherein the above Lewis acid component is selected from boron trichloride, titanium tetrachloride and tin tetrachloride.

(7) A process for producing an isobutylene polymer as described in any of the above (2) to (5), wherein the above electron donating component is selected from pyridines, amines, amides and sulfoxides.

(8) A process for producing an isobutylene polymer as described in any of the above (2) to (7), wherein the amounts of the above components (i) to (iv) are each regulated to the level as defined below:

(i) the concentration of a cation polymerizable monomer containing isobutylene ranges from 0.5 to 6 mol/l;

(ii) the amount of a compound represented by the formula (I) ranges from 0.1 to 10% by weight based on the cation polymerizable monomer containing isobutylene;

(iii) the amount of a Lewis acid is from 0.3 to 30 times by mol as much as the compound represented by the formula (I); and (iv) the amount of an electron donating component is from 0.05 to 2 times by mol as much as the compound represented by the formula (I).

(9) A process for producing an isobutylene polymer having a vinyl group introduced into the terminal thereof, which comprises reacting an isobutylene polymer, which is produced by a process as described in any of the above (1) to (8), with 1,9-decadiene.

(10) A process for producing an isobutylene polymer having a vinyl group introduced into the terminal thereof, which comprises reacting an isobutylene polymer, which is produced by a process as described in any of the above (1) to (8), with allyltrimethylsilane.

(11) An isobutylene polymer obtained by performing a cationic polymerization reaction in a polymerization solvent which contains primary and/or secondary monohalogenated hydrocarbon(s) having 3 to 8 carbon atoms.

(12) An isobutylene polymer obtained by mixing the following components (i) to (v) at a temperature of from −100° to 0° C.:

(i) a cationic polymerizable monomer containing isobutylene;

(ii) a compound represented by formula (I):

wherein $R^1$ represents an aromatic ring group, or a substituted or unsubstituted aliphatic hydrocarbon group; $R^2$ and $R^3$ may be the same or different and each represents a hydrogen atom, or a substituted or unsubstituted monovalent hydrocarbon group, provided that $R^2$ and $R^3$ do not represent a hydrogen atom at the same time when $R^1$ is an aliphatic hydrocarbon group; X represents a halogen atom, an $R^4COO$— group, in which $R^4$ represents a hydrogen atom or an alkyl group having 1 to 5 carbon atoms, or an $R^5O$— group, in which $R^5$ represents a hydrogen atom or an alkyl group having 1 to 5 carbon atoms; and n is an integer of from 1 to 8;

(iii) a Lewis acid, (iv) an electron donating component, in which a donor number defined as a parameter indicating the intensity of a various compound as an electron donor is 15 to 50; and (v) a polymerization solvent containing primary and/or secondary monohalogenated hydrocarbon(s) having 3 to 8 carbon atoms.

(13) An isobutylene polymer as described in the above (12), wherein the above primary and/or secondary monohalogenated hydrocarbons having 3 to 8 carbon atoms are selected from a group consisting of 1-chloropropane, 1-chloro-2-methylpropane, 1-chlorobutane, 1-chloro-2-methylbutane, 1-chloro-3-methylbutane, 1-chloro-2,2- dimethylbutane, 1-chloro-3,3-dimethylbutane, 1-chloro-2,3-dimethylbutane, 1-chloropentane, 1-chloro-2-methylpentane, 1-chloro-3-methylpentane, 1-chloro-4-methylpentane, 1-chlorohexane, 1-chloro-2-methylhexane, 1-chloro-3-methylhexane, 1-chloro-4-methylhexane, 1-chloro-5-methylhexane, 1-chloroheptane, 1-chlorooctane, 2-chloropropane, 2-chlorobutane, 2-chloropentane, 2-chlorohexane, 2-chloroheptane and 2-chlorooctane.

(14) An isobutylene polymer as described in the above (12) or (13), wherein the above polymerization solvent is a mixture of primary and/or secondary monohalogenated hydrocarbon(s) having 3 to 8 carbon atoms with aliphatic and/or aromatic hydrocarbon(s).

(15) An isobutylene polymer as described in the above (14), wherein the above aliphatic or aromatic hydrocarbons are selected from a group consisting of butane, pentane, neopentane, hexane, cyclohexane, methylcyclohexane, heptane, octane, benzene, toluene and xylene.

(16) An isobutylene polymer as described in any of the above (12) to (15), wherein the above Lewis acid component is selected from boron trichloride, titanium tetrachloride and tin tetrachloride.

(17) An isobutylene polymer as described in any of the above (12) to (16), wherein the above electron donating component is selected from pyridines, amines, amides and sulfoxides.

(18) An isobutylene polymer as described in any of the above (12) to (17), wherein the amounts of said components (i) to (iv) are each regulated to the level as defined below:

(i) the concentration of a cationic polymerizable monomer containing isobutylene ranges from 0.5 to 6 mol/l;

(ii) the amount of a compound represented by the formula (I) ranges from 0.1 to 10% by weight based on the cationic polymerizable monomer containing isobutylene;

(iii) the amount of a Lewis acid is from 0.3 to 30 times by mol as much as the compound represented by the formula (I); and (iv) the amount of an electron donating component is from 0.05 to 2 times by mol as much as the compound represented by the formula (I).

(19) An isobutylene polymer having a vinyl group introduced into the terminal thereof obtained by reacting an isobutylene polymer, which is produced by a process as described in any of the above (1) to (8), with 1,9-decadiene.

(20) An isobutylene polymer having a vinyl group introduced into the terminal thereof obtained by reacting an isobutylene polymer, which is produced by a process as described in any of the above (1) to (8), with allyltrimethylsilane.

(21) A process for producing an isobutylene polymer as described in any of the above (1) to (10), wherein the dielectric constant $\epsilon$ of the above polymerization solvent is $\epsilon \geq 3.5$.

(22) A process for producing an isobutylene polymer as described in any of the above (1) to (10), wherein the dielectric constant $\epsilon$ of the above polymerization solvent is $\epsilon \geq 4.5$.

(23) A process for producing an isobutylene polymer as described in any of the above (1) to (10), wherein the dielectric constant $\epsilon$ of the above polymerization solvent is $7.2 \geq \epsilon \geq 4.5$.

(24) An isobutylene polymer as described in any of the above (11) to (20), wherein the dielectric constant $\epsilon$ of the above polymerization solvent is $\epsilon \geq 3.5$.

(25) An isobutylene polymer as described in any of the above (11) to (20), wherein the dielectric constant $\epsilon$ of the above polymerization solvent is $\epsilon \geq 4.5$.

(26) An isobutylene polymer as described in any of the above (11) to (20), wherein the dielectric constant $\epsilon$ of the above polymerization solvent is $7.2 \geq \epsilon \geq 4.5$.

(27) A process for producing an isobutylene polymer as described in any of the above (1) to (10), wherein the above polymerization solvent is a mixture of monohalogenated hydrocarbon(s) with hydrocarbon(s) and the content of the monohalogenated hydrocarbon(s) ranges from 10 to 98% by weight.

(28) An isobutylene polymer as described in any of the above (11) to (20), wherein the above polymerization solvent is a mixture of monohalogenated hydrocarbon(s) with hydrocarbon(s) and the content of the monohalogenated hydrocarbon(s) ranges from 10 to 98% by weight.

DETAILED DESCRIPTION OF THE INVENTION

In the above (3), it is effective in the isolation of the isobutylene-based polymer, and the collection and purification of the solvent to select a monohalogenated hydrocarbon having a boiling point of from ordinary temperatures to 100° C.

In the above (4) and (5), the typical examples of the above primary and/or secondary monohalogenated hydrocarbons having 3 to 8 carbon atoms include 1-chloropropane, 1-chloro-2-methylpropane, 1-chlorobutane, 1-chloro-2-methylbutane, 1-chloro-3-methylbutane, 1-chloro-2,2-dimethylbutane, 1-chloro-3,3-dimethylbutane, 1-chloro-2,3-dimethylbutane, 1-chloropentane, 1-chloro-2-methylpentane, 1-chloro-3-methylpentane, 1-chloro-4-methylpentane, 1-chlorohexane, 1-chloro-2-methylhexane, 1-chloro-3-methylhexane, 1-chloro-4-methylhexane, 1-chloro-5-methylhexane, 1-chloroheptane, 1-chlorooctane, 2-chloropropane, 2-chlorobutane, 2-chloropentane, 2-chlorohexane, 2-chloroheptane and 2-chlorooctane, and the typical examples of the above aliphatic or aromatic hydrocarbons include butane, pentane, neopentane, hexane, cyclohexane, methylcyclohexane, heptane, octane, benzene, toluene and xylene.

The preferred examples of the mixture solvent of the primary and/or secondary monohalogenated hydrocarbon and the aliphatic or aromatic hydrocarbon include 1-chloropropane/pentane, 1-chloropropane/hexane, 2-chloropropane/hexane, 1-chlorobutane/pentane, 1-chlorobutane/hexane, 1-chlorobutane/heptane, 1-chlorobutane/octane, 1-chlorobutane/pentane, 2-chlorobutane/hexane, 1-chloropentane/pentane, 1-chloropentane/hexane and 1-chlorohexane/pentane. The mixing ratio of the primary and/or secondary monohalogenated hydrocarbon to the aliphatic or aromatic hydrocarbon may be appropriately determined depending on the physical properties (e.g., Mw/Mn) of the desired polymer to be produced. For example, the 1-chloropropane/hexane mixing ratio (weight/weight) ranges from 2/8 to 8/2, preferably from 6/4 to 4/6. The 1-chlorobutane/hexane mixing ratio (weight/weight) ranges from 4/6 to 8/2, preferably from 5/5 to 7/3. When the solvent mixing ratio is excluded from this range, the obtained polymer has a broadened molecular weight distribution (Mw/Mn) and it becomes difficult to introduce a terminal functional group thereinto. In such a case, moreover, p-DCC employed as a chain transfer agent or an initiator undergoes the formation of an indanyl ring, which causes the evolution of proton. As a result, a side reaction, whereby polymerization is initiated, is induced by the proton.

Figure 1:
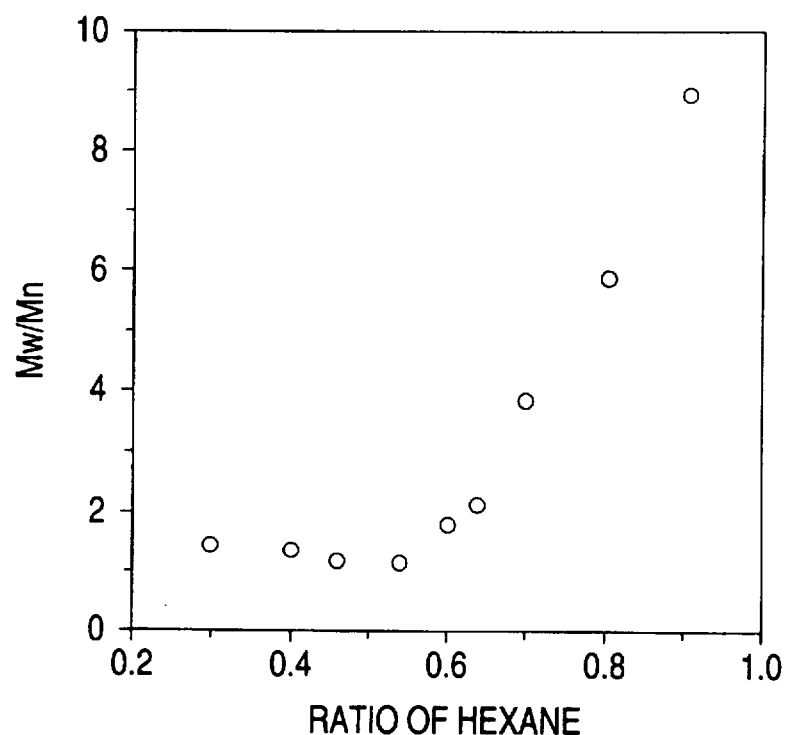
FIG. 1 is a graph which shows a relationship between the 1-chloropropane/hexane mixing ratio (weight/weight) and the Mw/Mn of the isobutylene polymer thus formed.
Figure 2:
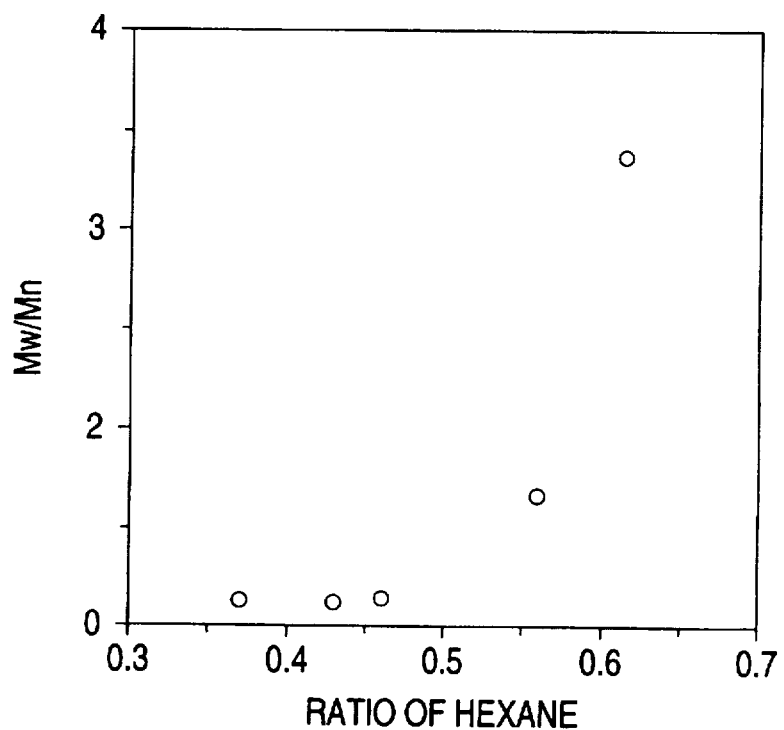
FIG. 2 is a graph which shows a relationship between the 1-chlorobutane/hexane mixing ratio (weight/weight) and the Mw/Mn of the isobutylene polymer thus formed.

FIG. 1 shows a relationship between the 1-chloropropane/hexane mixing ratio (weight/weight) and Mw/Mn, while FIG. 2 shows a relationship between the 1-chlorobutane/hexane mixing ratio (weight/weight) and Mw/Mn.

The present inventors have furthermore investigated the effect of the dielectric constant of the solvent on the polymerization reaction.

In the present invention, the dielectric constant of the solvent mixture system can be approximately calculated from the arithmetic mean of the mixing ratio of each component and the dielectric constant of each component on the weight average basis (cf. U.S. Pat. No. 5,169,914). The dielectric constant calculated and studied herein is one determined at 20° C.

As the results of the calculation of the dielectric constant for obtaining an excellent polymer, the present inventors have clarified that the dielectric constant of the solvent is preferably at least 3.5, more preferably at least 4.5 and most preferably from 4.5 to 7.2. When the dielectric constant is less than 3.5 or exceeds 7.2, the isobutylene polymer thus obtained shows a large Mw/Mn.

However, an excellent isobutylene polymer can be sometimes obtained regardless of the dielectric constant, when the production by the advantageous process, which is an object of the present invention, is not taken into consideration, i.e., the monomer concentration is lowered to a level less than 0.2 mol/l.

JP-A-3-318014 discloses 1-chlorobutane (n-butyl chloride) and its mixtures with n-heptane, etc. as polymerization solvents. However, no effect of the composition ratio of the solvent mixture is discussed therein, different from the present invention.

In the present invention, the number-average molecular weight (Mn) and Mw/Mn (Mw: weight-average molecular weight) of the isobutylene polymer are determined by GPC with the use of a polystyrene gel column (Shodex K-804, manufactured by Showa Denko K.K., mobile phase: chloroform) (in terms of polystyrene).

The number-average molecular weight (Mn) determined by GPC in the present invention usually ranges from 500 to 300,000, preferably from 1,000 to 50,000. when Mn is smaller than 500, it is impossible to obtain the excellent properties characteristic to isobutylene polymers. When it exceeds 300,000, on the other hand, the obtained polymer is in the form of a solid, which extremely deteriorates the handling characteristics.

In the present invention, the cationic polymerizable monomer containing isobutylene is not restricted to a monomer comprising isobutylene alone but involves those wherein not more than 50% (by mol, the same will apply hereinafter) of isobutylene has been replaced with cationic polymerizable monomer(s) copolymerizable with isobutylene.

Examples of the cation polymerizable monomers copolymerizable with isobutylene include olefins having 3 to 12 carbon atoms, conjugated dienes, vinyl ethers, aromatic vinyl compounds, norbornenes and vinylsilanes. Among these substances, olefins having 3 to 12 carbon atoms and aromatic vinyl compounds are preferable therefor.

Particular examples of the cation polymerizable monomers copolymerizable with isobutylene as described above usually include propene, 1-butene, 2-butene, 2-methyl-1-butene, 3-methyl-1-butene, pentene, hexene, cyclohexene, vinylcyclohexene, 5-ethylidenenorbornene, 5-propylidenenorbornene, butadiene, isoprene, cyclopentadiene, methyl vinyl ether, ethyl vinyl ether, isobutyl vinyl ether, vinylcarbazole, methoxystyrene, etoxystyrene, t-butoxystyrene, hexenyloxystyrene, styrene, α-methylstyrene, methylstyrene, dimethylstyrene, chloromethylstyrene, chlorostyrene, β-pinene, indene, vinyltrichlorosilane, vinylmethyldichlorosilane, vinyldimethylchorosilane, vinyldimethylmethoxysilane, vinyltrimethylsilane, divinyldichlorosilane, divinyldimethoxysilane, divinyldimethylsilane, 1,3-divinyl-1,1,3,3-tetramethyldisiloxane, trivinylmethylsilane, γ-methacryloyloxypropyltrimethoxysilane and γ-methacryloyloxypropylmethyldimethoxysilane.

Among these monomers, it is preferable to use propene, 1-butene, 2-butene, cyclopentadiene, 5-ethylidenenorbornene, isobutyl vinyl ether, methoxystyrene and styrene. These cationic polymerizable monomers copolymerizable with isobutylene may be used individually or in combination of two or more thereof.

In the present invention, the concentration of the cationic polymerizable monomer containing isobutylene, for example, in a batch system, usually ranges from 0.1 to 10 mol/l, preferably from 0.5 to 6 mol/l.

Examples of the compound represented by the formula (I) to be used in the present invention include a compound represented by the following formula (II):

wherein A represents a group having from 1 to 4 aromatic rings; Y represents a group, which is bonded to an aromatic ring, represented by the following formula (III):

wherein $R^6$ and $R^7$ may be the same or different and each represents a hydrogen atom or a monovalent hydrocarbon group having 1 to 20 carbon atoms; X represents a halogen atom, an $R^4COO$— group, in which $R^4$ represents a hydrogen atom or an alkyl group having 1 to 5 carbon atoms, or an $R^5O$— group, in which $R^5$ represents a hydrogen atom or an alkyl group having 1 to 5 carbon atoms; and n is an integer of from 1 to 8; a compound represented by the following formula (IV):

wherein B represents a substituted or unsubstituted hydrocarbon group having 4 to 40 carbon atoms; Z represents a halogen atom, bonded to the tertiary carbon atom, an $R^8COO$— group, in which $R^8$ represents a hydrogen atom or an alkyl group having 1 to 5 carbon atoms, or an $R^9O$— group, in which $R^9$ represents a hydrogen atom or an alkyl group having 1 to 5 carbon atoms, bonded to the tertiary carbon atom; and m is an integer of from 1 to 4; and oligomers having an α-halostyrene unit. However, the present invention is not restricted thereto. Either one of these compounds or a combination thereof may be employed.

In the compound of the formula (II), the group A having 1 to 4 aromatic rings may be either one formed by a condensation reaction or one of the uncondensed type. Examples of such a group having aromatic rings include phenyl, biphenyl naphthyl, anthryl, phenanthryl and pyrenyl groups, di- to pentavalent groups derived therefrom and mono- to hexavalent groups derived from Ph-(CH$_2$)$_L$-Ph wherein Ph represents a phenyl group and L is an integer of from 1 to 10. These groups having aromatic rings may be substituted by linear and/or branched aliphatic hydrocarbon groups having 1 to 20 carbon atoms or groups having functional groups such as hydroxyl, ether and vinyl groups.

As a compound represented by the formula (IV), use can be made of, for example, those having a functional group other than Z such as vinyl and silyl groups.

Examples of the oligomer having an α-halostyrene unit, which is usable as an initiator/chain transfer agent, include α-chlorostyrene oligomers and oligomers prepared by copolymerizing α-chlorostyrene with a monomer copolymerizable therewith.

In the present invention, it is highly effective to use a compound having two or more halogen atoms, R$^4$COO— groups (wherein R$^4$ represents a hydrogen atom or an alkyl group having 1 to 5 carbon atoms) or R$^5$O— groups (wherein R$^5$ represents a hydrogen atom or an alkyl group having 1 to 5 carbon atoms), or a compound having a halogen atom, an R$^4$COO— group or an R$^5$O— group together with other reactive functional group(s), from among those represented by the formula (I), as an initiator/chain transfer agent, since the functionality of the polymer thus obtained can be elevated thereby.

Particular examples of the compound represented by the above formula (I) include:

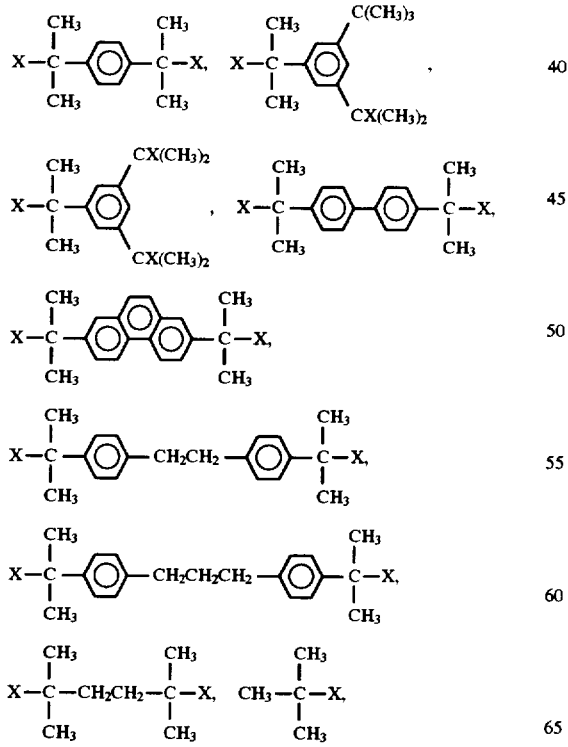

wherein X represents a halogen atom, an R$^4$COO— group (wherein R$^4$ represents a hydrogen atom or an alkyl group having 1 to 5 carbon atoms) or an R$^5$O— group (wherein R$^5$ represents a hydrogen atom or an alkyl group having 1 to 5 carbon atoms); and α-chlorostyrene oligomers, though the present invention is not restricted thereto. From among these compounds, the following compounds are preferred:

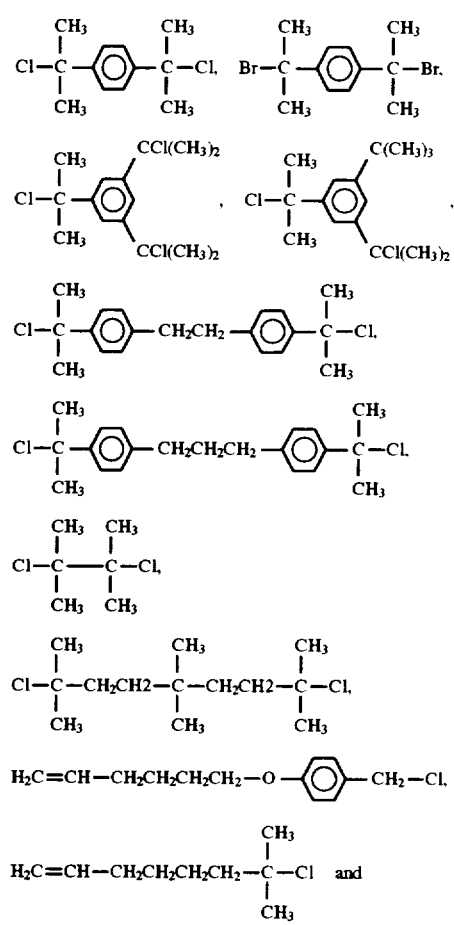

-continued

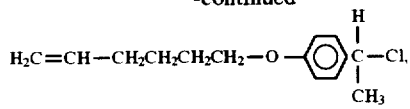

those having a CH$_3$COO— group such as:

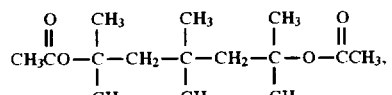

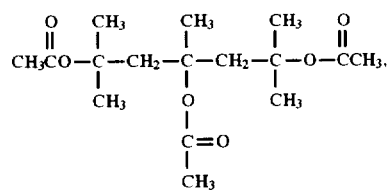

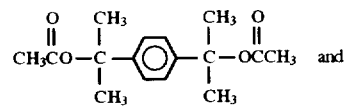

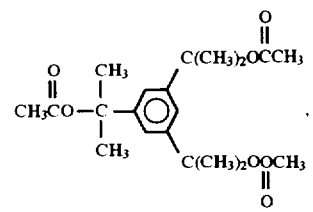

and those having a CH$_3$O— group such as:

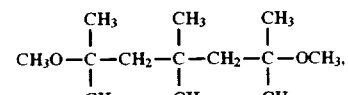

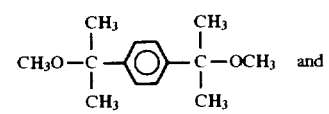

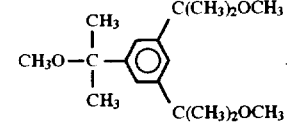

Either one of these compounds or a mixture thereof may be used in the present invention as an initiator/chain transfer agent. By regulating the amount of these compounds used, the number-average molecular weight of the isobutylene polymer thus obtained can be arbitrarily controlled.

In the present invention, the compound represented by the above formula (I) is usually employed in an amount of from 0.01 to 20% by weight, preferably from 0.1 to 10% by weight, based on the cationic polymerizable monomer containing isobutylene.

Examples of the Lewis acid to be used in the present invention usually include metal halides such as AlCl$_3$, SnCl$_4$, TiCl$_4$, VCl$_5$, FeCl$_3$, BCl$_3$ and BF$_3$ and organic aluminum compounds such as Et$_2$AlCl and EtAlCl$_2$, though the present invention is not restricted thereto. Preferable examples of the Lewis acid include TiCl$_4$, SnCl$_4$ and BCl$_3$.

In the present invention, the Lewis acid is usually employed in an amount of from 0.1 to 100 times by mol,
preferably from 0.3 to 30 times by mol, as much as the compound represented by the above formula (I).

The electron donating component to be used in the present invention may be selected from a broad range of the publicly known compounds, so long as the donor number thereof is 15 to 50. Preferable examples of the electron donating component include pyridines, amines, amides and sulfoxides, though the present invention is not restricted thereto.

Typical examples of the electron donating component to be used in the present invention, in which a donor number defined as a parameter indicating the intensity of an electron donor of various compounds is from 15 to 50, generally include 2,6-di-t-butylpyridine, 2-t-butylpyridine, 2,4,6-trimethylpyridine, 2,6-dimethylpyridine, 2-methylpyridine, pyridine, diethylamine, trimethylamine, triethylamine, tributylamine, diethylamine, N,N-dimethylaniline, aniline, N,N-dimethylformamide, N,N-dimethylacetamide, N,N-diethylacetamide, dimethyl sulfoxide, diethyl ether, methyl acetate, ethyl acetate, trimethyl phosphate, tributyl phosphate and triamide hexamethylphosphate. Preferable examples thereof include 2,6-di-t-butylpyridine, 2,6-dimethylpyridine, 2-methylpyridine, pyridine, diethylamine, triethylamine, N,N-dimethylformamide, N,N-dimethylacetamide and dimethyl sulfoxide, more preferably, picolines. Among all, it is particularly preferable to use 2-methylpyridine which achieves a remarkable effect in spite of the relatively low donor number. The various donor numbers are disclosed, for example, in V. Gutman, *Donor and Acceptor*, (translated by Otaki and Okada) Gakkai Shuppan Center (1983).

In the present invention, the electron donating component is usually employed in an amount of from 0.01 to 10 times by mol, preferably from 0.05 to 2 times by mol, as much as the compound represented by the above formula (I).

In the production process of the present invention, the conventional polymerization methods are widely applicable without restriction. For example, use can be made of a batch method which comprises adding a solution containing the Lewis acid (iii) to a solution containing (i) a cationic polymerizable monomer containing isobutylene, from among the above-mentioned (i) a cationic polymerizable monomer containing isobutylene, (ii) a compound represented by the above formula (I), (iii) a Lewis acid and (iv) an electron donating component. Alternatively, use can be made of a semi-batch method, which comprises continuously adding a solution containing (i) a cationic polymerizable monomer containing isobutylene to a solution containing (iii) a Lewis acid, or a continuous method which comprises effecting the reaction while continuously feeding all of the components and recovering the reaction product.

The present invention is characterized in that a solvent containing a primary and/or secondary monohalogenated hydrocarbon having 3 to 8 carbon atoms, which has been decomposed with a weak alkali and thus made harmless, can be treated with activated sludge.

In the present invention, the terminal of the isobutylene polymer obtained under the above-mentioned conditions can be successively converted into another functional group. When 1,9-decadiene is used as a terminal functionalizing agent, for example, the amount of the 1,9-decadiene is controlled usually to 2 to 30 times by mol, preferably 10 to 20 times by mol, as much as the used bifunctionl type initiator/chain transfer agent (for example, p-DCC). The 1,9-decadiene is reacted with the isobutylene polymer at the same temperature as the polymerization temperature usually for 3 to 6 hours. Thus an isobutylene polymer having a terminal vinyl group can be obtained.

When allyltrimethylsilane is used as a terminal functionalizing agent in the present invention, the amount of the allyltrimethylsilane is controlled usually to 2 to 4 times by mol as much as the used bifunctionl type initiator/chain transfer agent (for example, p-DCC). The allyltrimethylsilane is reacted with the isobutylene polymer at the same temperature as the polymerization temperature usually for 10 to 120 minutes, preferably for 30 to 60 minutes. Thus an isobutylene polymer having a terminal vinyl group can be obtained.

In accordance with the process of the present invention, not only the above-mentioned effects but also unexpected effects as will be described hereinafter can be established.

1. Compared with a case wherein a monohalogenated hydrocarbon having 2 or less carbon atoms is used, the polymerization proceeds at a lower reaction rate, which makes it possible to suppress a rise in temperature during the polymerization reaction.

2. After curing, the obtained isobutylene polymer has a hardness higher by 60% or more than those of the conventional polymers.

The following examples are provided to further illustrate the present invention in greater detail. It is to be understood, however, that the examples are illustration only and are not intended as a definition of the limits of the present invention. All the percentages are by weight unless otherwise indicated. The molecular weights given in these Examples were determined by GPC and NMR.

GPC analysis:

(system): System manufactured by Waters (pump 600E, differential refractometer 401).

(column): ShodexK-804, manufactured by Showa Denko K.K. (polystyrene gel).

(mobile phase: chloroform, number-average molecular weight, etc.: in terms of polystyrene).

$^1$H-NMR spectrum (300 MHz): Gemini-300, manufactured by Valian.

Fn* (vinyl), which stands for the number of vinyl groups per molecule of the isobutylene polymer, can be calculated based on the NMR spectrum and GPC data.

That is to say, Fn* (vinyl) can be determined in the following manner.

1) The molecular weight Mn (GPC) determined by GPC is divided by the molecular weight (56) of an isobutylene group to thereby determine the number of isobutylene groups per molecule of the oligomer. The number thus obtained is referred to as n*.

2) In NMR, the integral value of peaks attributable to hydrogen atoms in each functional group is determined.

3) The integral value determined in the above 2) is divided by the number of hydrogen atoms. (referred to as (1))

4) The value (1) corresponding to the isobutylene group is divided by n*. (referred to as (2))

5) The value (1) of each functional group is divided by (2). The value thus obtained is referred to as the number of the functional group per molecule of the oligomer (Fn*).

In all of the Examples of the present invention, the monomer/solvent ratio (weight/weight) was adjusted to 20/100. Tables 1 to 7 and Table 10 show the results of the polymerization reactions and the dielectric constants of the solvents at 20° C.

EXAMPLE 1

A 200 ml pressure glass container was provided with a three-way cock. After purging the container with nitrogen, 33.6 ml of 1-chlorobutane (which had been dried by allowing to stand with Molecular Sieves 3A overnight or longer), 71.2 ml of hexane (which had been dried by allowing to stand with Molecular Sieves 3A overnight or longer), and 289 mg (1.25 mmol) of p-DCC were charged thereinto with the use of a hypodermic syringe. Next, a pressure glass tube for collecting a liquefied gas, which contained 28.5 ml of isobutylene monomer and was provided with a needle valve, was connected to the three-way cock. The polymerization container was cooled by immersing in a dry ice/ethanol bath at −70° C. Then the pressure in the container was reduced with the use of a vacuum pump. After opening the needle valve, the isobutylene monomer was introduced from the tube for collecting the liquefied gas into the polymerization container followed by the introduction of nitrogen from one of the ways of the three-way cock, thus making the pressure in the container atmospheric. Subsequently, 0.0466 g (0.5 mmol) of 2-methylpyridine was added. Further, 0.69 ml (6.3 mmol) of titanium tetrachloride was added and the polymerization was initiated. 60 minutes thereafter, the reaction mixture was washed 4 times with 200 ml portions of water and the solvent was evaporated to thereby give an isobutylene polymer. Table 1 shows the properties of the polymer thus obtained.

EXAMPLE 2

An isobutylene polymer was prepared in the same manner as in Example 1 except for using 41.4 ml of 1-chlorobutane and 60.7 ml of hexane as a solvent. Then the isobutylene polymer thus produced was evaluated. Table 1 shows the results.

EXAMPLE 3

An isobutylene polymer was prepared in the same manner as in Example 1 except for using 46.6 ml of 1-chlorobutane and 53.7 ml of hexane as a solvent. Then the isobutylene polymer thus produced was evaluated. Table 1 shows the results.

EXAMPLE 4

An isobutylene polymer was prepared in the same manner as in Example 1 except for using 49.1 ml of 1-chlorobutane and 50.2 ml of hexane as a solvent. Then the isobutylene polymer thus produced was evaluated. Table 1 shows the results.

EXAMPLE 5

An isobutylene polymer was prepared in the same manner as in Example 1 except for using 54.3 ml of 1-chlorobutane and 43.2 ml of hexane as a solvent. Then the isobutylene polymer thus produced was evaluated. Table 1 shows the results.

TABLE 1

| Example No. | Dielectric Constant | Yield (%) | Mn (NMR) | Mn (GPC) | Mw/Mn |
|---|---|---|---|---|---|
| 1 | 4.03 | 98.2 | 23200 | 5500 | 3.34 |
| 2 | 4.53 | 100 | 19100 | 13200 | 1.64 |
| 3 | 4.86 | — | 18900 | 18500 | 1.13 |
| 4 | 5.02 | 100 | 19300 | 18400 | 1.10 |
| 5 | 5.36 | 100 | 19000 | 19900 | 1.12 |

EXAMPLE 6

An isobutylene polymer was prepared in the same manner as in Example 1 except for using 43.3 ml of 1-chloropentane and 58.4 ml of hexane as a solvent. Then the isobutylene-based polymer thus produced was evaluated. Table 2 shows the results.

EXAMPLE 7

An isobutylene polymer was prepared in the same manner as in Example 1 except for using 47.6 ml of 1-chloropentane and 52.6 ml of hexane as a solvent. Then the isobutylene polymer thus produced was evaluated. Table 2 shows the results.

EXAMPLE 8

An isobutylene polymer was prepared in the same manner as in Example 1 except for using 52.0 ml of 1-chloropentane and 46.7 ml of hexane as a solvent. Then the isobutylene polymer thus produced was evaluated. Table 2 shows the results.

EXAMPLE 9

An isobutylene polymer was prepared in the same manner as in Example 1 except for using 56.3 ml of 1-chloropentane and 40.9 ml of hexane as a solvent. Then the isobutylene polymer thus produced was evaluated. Table 2 shows the results.

TABLE 2

| Example No. | Dielectric Constant | Yield % | Mn (NMR) | Mn (GPC) | Mw/Mn |
|---|---|---|---|---|---|
| 6 | 4.25 | 100 | 19800 | 7800 | 3.38 |
| 7 | 4.48 | 100 | 19600 | 11500 | 2.11 |
| 8 | 4.72 | 87.4 | 20500 | 18100 | 1.25 |
| 9 | 4.95 | 100 | 22700 | 19000 | 1.20 |

EXAMPLE 10

An isobutylene polymer was prepared in the same manner as in Example 1 except for using 8.6 ml of 1-chloropropane and 105.1 ml of hexane as a solvent. Then the isobutylene polymer thus produced was evaluated. Table 3 shows the results.

EXAMPLE 11

An isobutylene polymer was prepared in the same manner as in Example 1 except for using 17.1 ml of 1-chloropropane and 93.4 ml of hexane as a solvent. Then the isobutylene polymer thus produced was evaluated. Table 3 shows the results.

EXAMPLE 12

An isobutylene polymer was prepared in the same manner as in Example 1 except for using 25.7 ml of 1-chloropropane and 81.8 ml of hexane as a solvent. Then the isobutylene polymer thus produced was evaluated. Table 3 shows the results.

EXAMPLE 13

An isobutylene polymer was prepared in the same manner as in Example 1 except for using 30.8 ml of 1-chloropropane and 74.7 ml of hexane as a solvent. Then the isobutylene polymer thus produced was evaluated. Table 3 shows the results.

EXAMPLE 14

An isobutylene polymer was prepared in the same manner as in Example 1 except for using 34.3 ml of 1-chloropropane and 70.1 ml of hexane as a solvent. Then the isobutylene polymer thus produced was evaluated. Table 3 shows the results.

EXAMPLE 15

An isobutylene polymer was prepared in the same manner as in Example 1 except for using 39.4 ml of 1-chloropropane and 63.1 ml of hexane as a solvent. Then the isobutylene polymer thus produced was evaluated. Table 3 shows the results.

EXAMPLE 16

An isobutylene polymer was prepared in the same manner as in Example 1 except for using 46.2 ml of 1-chloropropane and 53.7 ml of hexane as a solvent. Then the isobutylene polymer thus produced was evaluated. Table 3 shows the results.

EXAMPLE 17

An isobutylene polymer was prepared in the same manner as in Example 1 except for using 57.2 ml of 1-chloropropane and 38.2 ml of hexane as a solvent. Then the isobutylene polymer thus produced was evaluated. Table 3 shows the results.

EXAMPLE 18

An isobutylene polymer was prepared in the same manner as in Example 1 except for using 65.0 ml of 1-chloropropane and 27.9 ml of hexane as a solvent. Then the isobutylene polymer thus produced was evaluated. Table 3 shows the results.

TABLE 3

| Example No. | Dielectric Constant | Yield (%) | Mn (NMR) | Mn (GPC) | Mw/Mn |
|---|---|---|---|---|---|
| 10 | 2.47 | 99 | — | 3900 | 8.82 |
| 11 | 3.05 | 84 | — | 4400 | 5.85 |
| 12 | 3.63 | 89 | 12300 | 4900 | 3.83 |
| 13 | 3.98 | — | 16700 | 8900 | 2.12 |
| 14 | 4.21 | 96 | 21500 | 10400 | 1.82 |
| 15 | 4.56 | 100 | 21400 | 20400 | 1.12 |
| 16 | 5.03 | 100 | 18900 | 20000 | 1.17 |
| 17 | 5.78 | 78 | — | 15300 | 1.38 |
| 18 | 6.30 | 98 | — | 22400 | 1.45 |

COMPARATIVE EXAMPLE 1

An isobutylene polymer was prepared in the same manner as in Example 1 except for using 39.7 ml of 1-chloro-1.1-dimethylpropane and 63.1 ml of hexane as a solvent. Then the isobutylene polymer thus produced was evaluated. Table 4 shows the results.

COMPARATIVE EXAMPLE 2

An isobutylene polymer was prepared in the same manner as in Example 1 except for using 48.3 ml of 1-chloro-1.1-dimethylpropane and 51.4 ml of hexane as a solvent. Then the isobutylene polymer thus produced was evaluated. Table 4 shows the results.

TABLE 4

| Comparative Example No. | Yield (%) | Mn (NMR) | Mn (GPC) | Mw/Mn |
|---|---|---|---|---|
| 1 | 98 | 23200 | 5500 | 3.34 |
| 2 | 110 | 20900 | 1480 | 8.37 |

EXAMPLE 19

A 500 ml four-necked flask was provided with a three-way cock. After purging the container with nitrogen, 196.4 ml of 1-chlorobutane (which had been dried by allowing to stand with Molecular Sieves 3A overnight or longer), 200.8 ml of hexane (which had been dried by allowing to stand with Molecular Sieves 3A overnight or longer), and 1156 mg (500 mmol) of p-DCC were charged thereinto with the use of a hypodermic syringe. Next, a pressure glass tube for collecting a liquefied gas, which contained 114 ml of isobutylene monomer and was provided with a needle valve, was connected to the three-way cock. The polymerization container was cooled by immersing in a dry ice/ethanol bath at −70° C. Then the pressure in the container was reduced with the use of a vacuum pump. After opening the needle valve, the isobutylene monomer was introduced from the tube for collecting the liquefied gas into the polymerization container followed by the introduction of nitrogen from one of the ways of the three-way cock, thus making the pressure in the container atmospheric. Subsequently, 184 mg g (1.98 mmol) of 2-methylpyridine was added. Further, 2.76 ml (25.2 mmol) of titanium tetrachloride was added and the polymerization was initiated. At the initiation of the reaction, an increase in temperature of 6.2° C. was observed. 80 minutes thereafter, 2.76 ml of titanium tetrachloride and 13.8 ml of 1,9-decadiene were added. A definite period of time (as specified in Table 5) after the initiation of the reaction, the reaction mixture was washed 4 times with 200 ml portions of water and the solvent was evaporated. The isobutylene polymer thus obtained was dissolved in a small amount of hexane. To the resulting solution was added 200 ml of acetone under stirring. The polymer was separated by precipitation and once prepared into a hexane solution. Then the volatile component was evaporated to thereby give an isobutylene polymer. Table 5 shows the properties of the polymer thus obtained.

TABLE 5

| Example No. | Reaction Time (min) | Yield (%) | Mn (NMR) | Mn (GPC) | Mw/Mn | Fn* (vinyl) |
|---|---|---|---|---|---|---|
| 19 | 60 | 101 | 17600 | 17100 | 1.13 | 1.02 |
| " | 120 | 100 | 20800 | 17900 | 1.14 | 1.50 |
| " | 200 | 99 | 17400 | 18600 | 1.16 | 1.74 |
| " | 240 | 98 | 18300 | 19000 | 1.16 | 1.93 |
| " | 300 | 97 | 17500 | 19100 | 1.16 | 1.74 |
| " | 360 | 100 | 16400 | 19000 | 1.16 | 1.16 |

*: Dielectric constant of solvent: 5.02.

EXAMPLE 20

A 300 ml four-necked flask was provided with a three-way cock. After purging the container with nitrogen, 78.8 ml of 1-chloropropane (which had been dried by allowing to stand with Molecular Sieves 3A overnight or longer), 126.2 ml of hexane (which had been dried by allowing to stand with Molecular Sieves 3A overnight or longer), and 578 mg (2.50 mmol) of p-DCC were charged thereinto with the use of a hypodermic syringe. Next, a pressure glass tube for collecting a liquefied gas, which contained 57 ml of isobutylene monomer and was provided with a needle valve, was connected to the three-way cock. The polymerization container was cooled by immersing in a dry ice/ethanol bath at −70° C. Then the pressure in the container was reduced with the use of a vacuum pump. After opening the needle valve, the isobutylene monomer was introduced from the tube for collecting the liquefied gas into the polymerization container followed by the introduction of nitrogen from one of the ways of the three-way cock, thus making the pressure in the container atmospheric. Subsequently, 90 mg g (0.99 mmol) of 2-methylpyridine was added. Further, 1.38 ml (12.6 mmol) of titanium tetrachloride was added and the polymerization was initiated. At the initiation of the reaction, an increase in temperature of 9.7° C. was observed. 60 minutes thereafter, 1.38 ml of titanium tetrachloride and 6.9 ml of 1,9-decadiene were added. A definite period of time (as specified in Table 6) after the initiation of the reaction, the reaction mixture was washed 4 times with 200 ml portions of water and the solvent was evaporated. The isobutylene polymer thus obtained was dissolved in a small amount of hexane. To the resulting solution was added 200 ml of acetone under stirring. The polymer was separated by precipitation and once prepared into a hexane solution. Then the volatile component was evaporated to thereby give an isobutylene polymer. Table 6 shows the properties of the polymer thus obtained.

TABLE 6

| Example No. | Reaction Time (min) | Yield (%) | Mn (NMR) | Mn (GPC) | Mw/Mn | Fn* (vinyl) |
|---|---|---|---|---|---|---|
| 20 | 30 | 98 | 18800 | 18000 | 1.18 | 0.46 |
| " | 60 | 99 | 18100 | 18800 | 1.20 | 0.95 |
| " | 120 | 97 | 19900 | 18800 | 1.19 | 0.58 |
| " | 180 | 101 | 17800 | 19000 | 1.20 | 1.65 |
| " | 240 | 96 | 18100 | 19800 | 1.20 | 1.42 |

*: Dielectric constant of solvent: 4.56.

EXAMPLE 21

A 300 ml four-necked flask was provided with a three-way cock. After purging the container with nitrogen, 70 ml of 1-chloropropane (which had been dried by allowing to stand with Molecular Sieves 3A overnight or longer), 126.2 ml of hexane (which had been dried by allowing to stand with Molecular Sieves 3A overnight or longer), and 578 mg (2.50 mmol) of p-DCC were charged thereinto with the use of a hypodermic syringe. Next, a pressure glass tube for collecting a liquefied gas, which contained 57 ml of isobutylene monomer and was provided with a needle valve, was connected to the three-way cock. The polymerization container was cooled by immersing in a dry ice/ethanol bath at −70° C. Then the pressure in the container was reduced with the use of a vacuum pump. After opening the needle valve, the isobutylene monomer was introduced from the tube for collecting the liquefied gas into the polymerization container followed by the introduction of nitrogen from one of the ways of the three-way cock, thus making the pressure in the container atmospheric. Subsequently, 90 mg g (0.99 mmol) of 2-methylpyridine was added. Further, 1.38 ml (12.6 mmol) of titanium tetrachloride diluted with 8.8 ml of 1-chloropropane was added and the polymerization was initiated. At the initiation of the reaction, an increase in temperature of 6.7° C. was observed. 60 minutes thereafter, 1.33 ml of allyltrimethylsilane was added. A definite period of time (as specified in Table 7) after the initiation of the reaction, the reaction mixture was washed 4 times with 100 ml portions of water and the solvent was evaporated to thereby give an isobutylene polymer. Table 7 shows the properties of the polymer thus obtained.

TABLE 7

| Example No. | Reaction Time (min) | Yield (%) | Mn (NMR) | Mn (GPC) | Mw/Mn | Fn* (viny) |
| --- | --- | --- | --- | --- | --- | --- |
| 21 | 10 | — | 17800 | 18200 | 1.18 | 1.71 |
| " | 30 | 104 | 18000 | 18500 | 1.17 | 2.07 |
| " | 60 | 96 | 18600 | 18500 | 1.17 | 1.87 |
| " | 90 | 107 | 19400 | 18400 | 1.17 | 1.89 |
| " | 120 | 102 | 18300 | 18400 | 1.17 | 1.97 |

*: Dielectric constant of solvent: 4.56.

EXAMPLE 22

In accordance with Example 9 of JP-A-3-95266, an organic curable agent having hydrosilyl groups was synthesized from 1,9-decadiene and polyhydrogen siloxane (LS8600, manufactured by Shin-Etsu Chemical Co., Ltd.). By using this hydrocarbon-added curing agent, the isobutylene polymer produced in Example 19 of the present invention was cured in the same manner as described in Example 11 of JP-A-3-95266 to give a cured product. Table 8 shows the result. From a sheet of the cured product thus obtained, a dumbbell No. 3 in accordance with JISK 6301 was blanked and subjected to a tensile test at a tensile speed of 200 mm/min. EB (%), which means the deformation of the test piece at break under tension, is expressed in the rate (%) of the elongation to the starting length. TB (kgf/cm$^2$) means the maximum stress at break. M means the modulus and the number following M means the elongation expressed in %.

COMPARATIVE EXAMPLE 3

An isobutylene polymer was prepared in the same manner as in Example 22 except for using methylene chloride in place of 1-chlorobutane. Then the isobutylene polymer thus produced was cured in the same manner as described in Example 22 to give a cured product. Table 8 shows the results.

TABLE 8

| Example No. | M30 (kgf/cm$^2$) | M50 | M100 | M150 | TB (kgf/cm$^2$) | EB (%) |
| --- | --- | --- | --- | --- | --- | --- |
| Ex. 22 | 2.47 | 3.38 | 4.48 | 6.1 | 16.25 | 503 |
| Comp. Ex. 3 | 1.57 | 2.02 | 2.78 | 3.38 | 10.08 | 672 |

Figure 3:
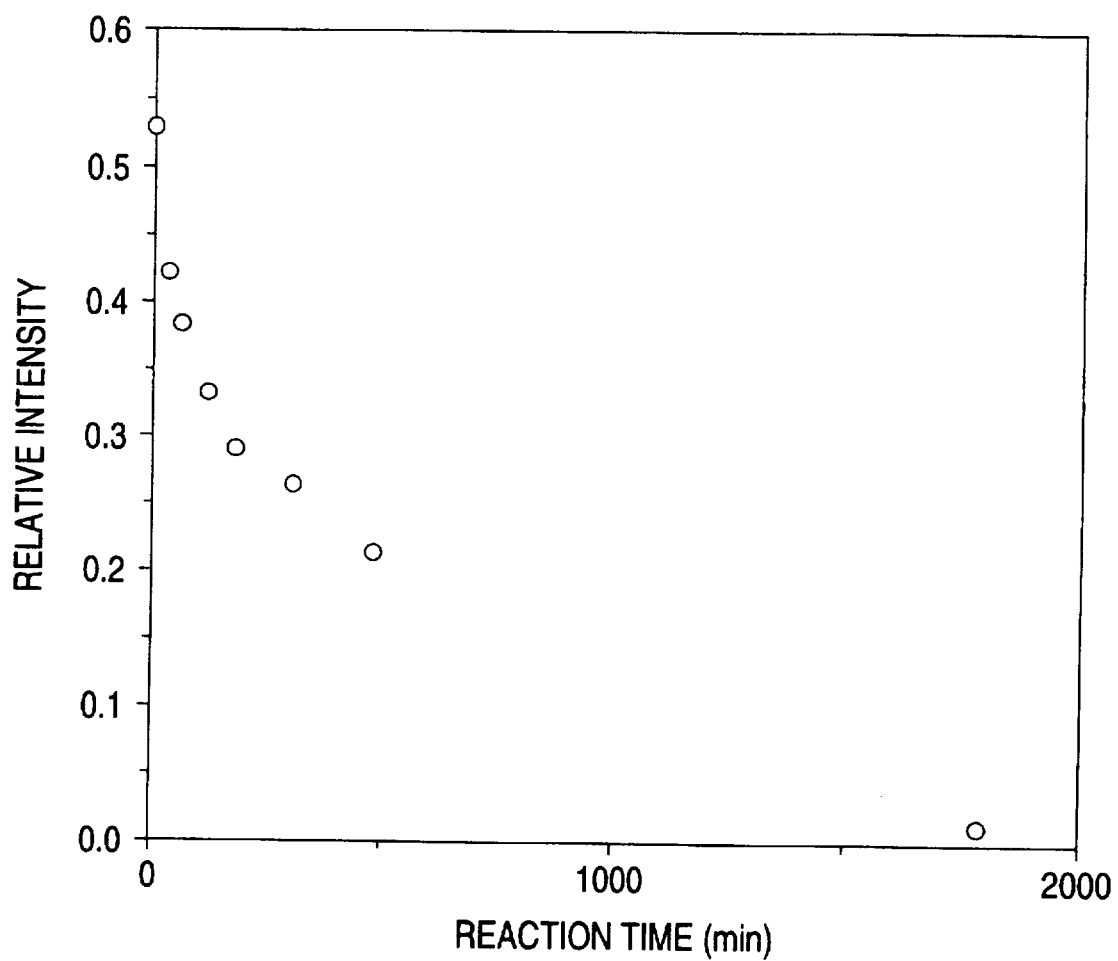
FIG. 3 is a graph showing the results of Referential Example wherein the ordinate refers to the relative intensity of 1-chlorobutane concentration while the abscissa refers to the reaction time.

REFERENTIAL EXAMPLE 500 ml of pure water saturated with 1-chlorobutane was prepared and 2 g of granular sodium hydroxide was dissolved therein. The resulting solution was stirred at room temperature (25° to 30° C.) followed by the extraction of the sample with 50 ml toluene. The organic layer was analyzed by gas chromatography to thereby determine the concentration of 1-chlorobutane contained in toluene. The results are shown in Table 9. From the results of Table 9, it can be seen that 1-chlorobutane can be easily decomposed with an alkali, which facilitates the waste water treatment (see FIG. 3).

TABLE 9

| Example No. | Reaction Time (min) | Relative Intensity |
| --- | --- | --- |
| Referential Ex. | 0 | 0.530 |
| " | 30 | 0.424 |
| " | 60 | 0.384 |
| " | 120 | 0.332 |
| " | 180 | 0.289 |
| " | 300 | 0.260 |
| " | 480 | 0.210 |
| " | 1800 | 0.012 |

EXAMPLE 23

An isobutylene polymer was prepared in the same manner as in Example 1 except for using 86.6 ml of 1-chlorobutane as a solvent. Then the isobutylene polymer thus obtained was evaluated. Table 10 shows the results.

EXAMPLE 24

An isobutylene polymer was prepared in the same manner as in Example 1 except for using 86.0 ml of 1-chloropropane as a solvent. Then the isobutylene polymer thus obtained was evaluated. Table 10 shows the results.

TABLE 10

| Example No. | Dielectric Constant | Yield (%) | Mn (NMR) | Mn (GPC) | Mw/Mn |
| --- | --- | --- | --- | --- | --- |
| 23 | 7.39 | 100 | 17100 | 8700 | 2.30 |
| 24 | 7.7 | 100 | — | 4600 | 2.74 |

While the invention has been described in detail and with reference to specific embodiments thereof, it will be apparent to one skilled in the art that various changes and modifications can be made therein without departing from the spirit and scope thereof.

What is claimed is:

1. A process for producing an isobutylene polymer having a vinyl group introduced into the terminal thereof, which comprises:

mixing the following components (i) to (v) at a temperature of from −100° to 0° C. to obtain an isobutylene polymer;

(i) a cation polymerizable monomer containing isobutylene;

(ii) a compound represented by formula (I):

wherein R$^1$ represents an aromatic ring group, or a substituted or unsubstituted aliphatic hydrocarbon group; R$^2$ and R$^3$ may be the same or different and each represents a hydrogen atom, or a substituted or unsubstituted monovalent hydrocarbon group, provided that R$^2$ and R$^3$ do not represent a hydrogen atom at the same time when R$^1$ is an aliphatic hydrocarbon group; X represents a halogen atom, an R$^4$COO— group, in which R$^4$ represents a hydrogen atom or an alkyl group having 1 to 5 carbon atoms, or an R$^5$O— group, in which R$^5$ represents a hydrogen atom or an alkyl group having 1 to 5 carbon atoms; and n is an integer of from 1 to 8;

(iii) a Lewis acid, (iv) an electron donating component having a donor number of 15 to 50; and (v) a polymerization solvent containing primary and/or secondary monohalogenated hydrocarbon(s) having 3 to 8 carbon atoms; and reacting the obtained isobutylene polymer with one of 1,9-decadiene and allyltrimethylsilane.

2. A process as claimed in claim 2, wherein said primary and/or secondary monohalogenated hydrocarbons having 3 to 8 carbon atoms are selected from a group consisting of 1-chloropropane, 1-chloro-2-methylpropane, 1-chlorobutane, 1-chloro-2-methylbutane, 1-chloro-3-methylbutane, 1-chloro-2,2-dimethylbutane, 1-chloro-3,3-dimethylbutane, 1-chloro-2,3-dimethylbutane, 1-chloropentane, 1-chloro-2-methylpentane, 1-chloro-3-methylpentane, 1-chloro-4-methylpentane, 1-chlorohexane, 1-chloro-2-methylhexane, 1-chloro-3-methylhexane, 1-chloro-4-methylhexane, 1-chloro-5-methylhexane, 1-chloroheptane, 1-chlorooctane, 2-chloropropane, 2-chlorobutane, 2-chloropentane, 2-chlorohexane, 2-chloroheptane and 2-chlorooctane.

3. A process as claimed in claim 1, wherein said polymerization solvent is a mixture of primary and/or secondary monohalogenated hydrocarbon(s) having 3 to 8 carbon atoms with aliphatic and/or aromatic hydrocarbon(s).

4. A process as claimed in claim 3, wherein said aliphatic or aromatic hydrocarbons are selected from a group consisting of butane, pentane, neopentane, hexane, cyclohexane, methylcyclohexane, heptane, octane, benzene, toluene and xylene.

5. A process as claimed in claim 1, wherein said Lewis acid component is selected from boron trichloride, titanium tetrachloride and tin tetrachloride.

6. A process for producing an isobutylene-based polymer as claimed in claim 1, wherein said electron donating component is selected from pyridines, amines, amides and sulfoxides.

7. A process as claimed in claim 1, wherein the amounts of said components (i) to (iv) are each regulated to the level as defined below:

(i) the concentration of a cation polymerizable monomer containing isobutylene ranges from 0.5 to 6 mol/l;

(ii) the amount of a compound represented by the formula (1) ranges from 0.1 to 10% by weight based on the cation polymerizable monomer containing isobutylene;

(iii) the amount of a Lewis acid is from 0.3 to 30 times by mol as much as the compound represented by the formula (I); and (iv) the amount of an electron donating component is from 0.05 to 2 times by mol as much as the compound represented by the formula (I).

8. A process as claimed in claim 2 wherein said obtained isobutylene polymer is reacted with 1,9-decadiene.

9. A process as claimed in claim 2 wherein said obtained isobutylene polymer is reacted with allyltrimethylsilane.

10. A process as claimed in claim 1, wherein the dielectric constant $\epsilon$ of said polymerization solvent is $\epsilon \geq 3.5$.

11. A process as claimed in claim 1, wherein the dielectric constant $\epsilon$ of said polymerization solvent is $\epsilon \geq 4.5$.

12. A process as claimed in claim 1, wherein the dielectric constant $\epsilon$ of said polymerization solvent is $7.2 \geq \epsilon \geq 4.5$.

13. A process as claimed in claim 1, wherein said polymerization solvent is a mixture of monohalogenated hydrocarbon(s) with hydrocarbon(s) and the content of the monohalogenated hydrocarbon(s) ranges from 10 to 98% by weight.

14. A process as claimed in claim 2, wherein said cation polymerizable monomer contains 50 mole % or more of isobutylene.

* * * * *